US009955444B1

(12) United States Patent
Blum et al.

(10) Patent No.: US 9,955,444 B1
(45) Date of Patent: Apr. 24, 2018

(54) DATA SYNCHRONIZATION ACROSS MULTIPLE DEVICES CONNECTING TO MULTIPLE DATA CENTERS (71) Applicant: PubNub Inc., San Francisco, CA (US)

(72) Inventors: Stephen Blum, San Francisco, CA (US); Dara Kong, Bellflower, CA (US); Aaron Levy, San Francisco, CA (US); Bhagat Nainani, Fremont, CA (US); Jochen Roth, San Francisco, CA (US); Jason Oster, San Francisco, CA (US); Geremy Cohen, San Francisco, CA (US)

(73) Assignee: PubNub Inc., San Francisco, CA (US)

( * ) Notice: Subject to any disclaimer, the term of this patent is extended or adjusted under 35 U.S.C. 154(b) by 259 days.

(21) Appl. No.: 14/933,640

(22) Filed: Nov. 5, 2015

Related U.S. Application Data (60) Provisional application No. 62/075,431, filed on Nov. 5, 2014.

(51) Int. Cl.
G06F 15/16 (2006.01)
H04W 56/00 (2009.01)
H04W 12/04 (2009.01)
G06F 17/30 (2006.01)
G06F 21/30 (2013.01)
H04L 29/06 (2006.01)
(Continued)

(52) U.S. Cl.
CPC .... H04W 56/001 (2013.01); G06F 17/30575 (2013.01); G06F 17/30864 (2013.01); G06F 21/30 (2013.01); H04L 65/60 (2013.01); H04L 67/1095 (2013.01); H04W 12/04 (2013.01); H04W 12/06 (2013.01)

(58) Field of Classification Search
CPC ............... H04L 67/1095; H04L 65/60; G06F 17/30575; G06F 21/30; G06F 21/31; G06F 17/30864; H04W 12/06; H04W 12/04
USPC ........................ 709/248, 218, 217
See application file for complete search history.

(56) References Cited

U.S. PATENT DOCUMENTS 6,446,092 B1   9/2002 Sutter
9,275,204 B1 * 3/2016 Orr ..................... G06F 21/30
(Continued)

OTHER PUBLICATIONS

Brian Oliver, Global Solutions Architect, Oracle Coherence presentation, Connecting Coherence Data Grids Over a Wide-Area Network, Jan. 2009, pp. 1-18.

(Continued)

Primary Examiner — Kyung H Shin
(74) Attorney, Agent, or Firm — Fox Rothschild LLP (57) ABSTRACT A system synchronizes data across multiple data centers to geographically distributed clients may receive current versions of the objects (or portions of objects) from whatever data center is closest to the client. When one of the data centers receives an application object from a first client, it may save the application object in a data collection at that data center. It may also send the application object to other data centers so that the application object is replicated among each of the other data centers. Each of the data centers will relay the updates to the other data centers subscribing clients via various channels, while at least some of the data centers will make the updates available to clients who request the updates. Optionally, the data centers also may publish change notification messages to the channels.

16 Claims, 8 Drawing Sheets (51) Int. Cl.
*H04L 29/08* (2006.01)
*H04W 12/06* (2009.01)

(56) References Cited

U.S. PATENT DOCUMENTS

| | | |
|---|---|---|
| 2002/0147929 A1 | 10/2002 | Rose |
| 2002/0152257 A1 | 10/2002 | Frolik et al. |
| 2004/0158870 A1 | 8/2004 | Paxton et al. |
| 2004/0196842 A1 | 10/2004 | Dobbins |
| 2007/0061282 A1 | 3/2007 | Ganguly et al. |
| 2009/0043867 A1* | 2/2009 | Sharp .................. H04L 67/1095 709/218 |
| 2009/0235347 A1 | 9/2009 | Syed et al. |
| 2009/0319356 A1 | 12/2009 | Spitzer et al. |
| 2010/0088389 A1 | 4/2010 | Buller et al. |
| 2011/0225417 A1 | 9/2011 | Maharajh et al. |
| 2012/0117605 A1 | 5/2012 | Miao et al. |
| 2012/0131139 A1* | 5/2012 | Siripurapu ........ G06F 17/30864 709/217 |
| 2012/0303912 A1 | 11/2012 | Calder et al. |

OTHER PUBLICATIONS

Oracle® Fusion Middleware manual, Developing Web Applications, Servlets, and JSPs for Oracle WebLogic Server, 11g Release 1 (10.3.1), May 2009, Chapter 12, "Using the HTTP Publish-Subscribe Server", pp. 12-1 to 12-24.

Alex Russell et al., The Bayeux Specification, "Bayeux Protocol—Bayeux 1.0.0", Sep. 20, 2012, pp. 1-27, svn.cometd.com/trunk/bayeux/bay eux.html.

\* cited by examiner

| Players~John~AccountInfo~Company | Players~John~AccountInfo~CustomerTier | Players~John~Avatar |
|---|---|---|
| PubNub | Gold | Default |

| Players~John~UserID | Players~John~UserInfo~address | Players~John~UserInfo~first |
|---|---|---|
| 1234 | 123 Folsom St | John |

| Players~John~UserInfo~last | Players~John~UserInfo~phone |
|---|---|
| Smith | 415-340-4500 |

```
{
  "Players": {
    "John": {
      "AccountInfo": {
        "Company": "PubNub",
        "CustomerTier": "Gold"
      },
      "Avatar": "Default",
      "UserID": "1234",
      "UserInfo": {
        "address": "123 Folsom St",
        "first": "John",
        "last": "Smith",
        "phone": "415-340-4500"
      }
    }
  }
}
```

FIG. 6

Start at: "Players~John~AccountInfo~"
End at: "Payers~John~AccountInfo~"

| Players~John~AccountInfo~Company | Players~John~AccountInfo~CustomerTier | Players~John~Avatar |
|---|---|---|
| Pubnub | Gold | Default |

```
{
 "Players": {
  "John": {
   "AccountInfo": {
    "Company": "Pubnub",
    "CustomerTier": "Gold",
}}}}
```

FIG. 7

| msgs~)0~text~ | msgs~)0~user~ | msgs~)1~text~ | msgs~)1~user~ |
|---|---|---|---|
| "Hello" | "John" | "Goodbye" | "Mary" |
| ``{`` "msgs": [ {"user": "John", "text": "Hello"}, {"user": "Mary", "text": "Goodbye"}, ] ``}`` | | Pros: <br>• All values referenceable by index and path. <br>• E.g. /msgs/0/text = "asdf" <br>• Same schema for object / list <br><br>Cons: <br>• Index is a pre-sorted by type <br>• High overhead for simple lists (e.g. [1,2,3]) <br>• Potential for "hot" rows | |

FIG. 8

DATA SYNCHRONIZATION ACROSS MULTIPLE DEVICES CONNECTING TO MULTIPLE DATA CENTERS

RELATED APPLICATIONS

This application claims priority to U.S. Provisional Application Ser. No. 62/075,431, filed Nov. 5, 2014, the contents of which are incorporated herein by reference in its entirety.

BACKGROUND

This disclosure relates to methods and systems for distributing data over wide area networks such as the Internet.

As the need increases to cheaply deliver, with low latency, large quantities of data to a multitude of global recipients over the Internet, improved message delivery methods and systems are desired to fulfill this need. In many distributed applications (such as multiplayer games, social apps, taxi dispatch apps), there is a need to share some common state across multiple users and client devices. Often, this state is kept in "state objects" which must be kept in sync across every device running the application. When any client device updates these state objects, the updates must be synchronized with sub-second latencies across all other devices running the application. This technology requirement is sometimes called "real-time data sync."

One existing approach for real-time data sync is to maintain a copy of the state objects within a data center in a backend store. This backend store becomes the "system of record" for these state objects.

While this prior approach solves the problem of high-speed synchronization across devices, it does not address several important needs. First, mission critical applications require replication of application state across multiple disparate data centers for redundancy. Second, applications with geographically distributed users require low latency real-time data sync for all their users, not just those users who happen to reside near the data center hosting the backend store. In addition, existing solutions do not automatically synchronize the object state in the client application on a mobile device. Instead, existing solutions expect the application to periodically check or register callbacks to obtain notification of a change.

This document describes method and systems that solve at least some of the problems discussed above.

SUMMARY

A system that synchronizes data across multiple data centers to geographically distributed clients may receive current versions of the objects (or portions of objects) from whatever data center is closest to the client. When one of the data centers receives an application object from a first client, it may save the application object in a data collection at that data center. It may also send the application object to other data centers so that the application object is replicated among each of the other data centers. Each of the data centers will relay the updates to the other data centers subscribing clients via various channels, while at least some of the data centers will make the updates available to clients who request the updates. Optionally, the data centers also may publish change notification messages to the channels. The first data center may save the application object to a computer readable medium in a format such as a list structure.

In an embodiment, a method of synchronizing data to multiple users via multiple data centers includes, by a first data center of a plurality of data centers: (i) receiving an application object from a first client, wherein the application object comprises a key and a value; (ii) saving the application object in a data collection at the first data center; and (iii) sending the application object to all other data centers in the plurality of data centers so that the application object is replicated among each of the plurality of data centers. A second data center of the plurality of data centers may identify a credential for a second client, wherein the credential corresponds to the key, and provide at least a portion of the application object to the second client.

Optionally, when the second data center provides the application object to the second client, it may automatically, without requiring an intervening request from the second client for the application object, send at least a portion of the application object to the second client. When automatically sending at least a portion of the application object to the second client, the second data center may identify a channel to which the subscriber subscribes, select a portion of the application object that corresponds to the channel, and when sending the at least a portion of the application object to the second client, send only the portion of the application object that corresponds to the channel.

Optionally, the second data center may receive an updated instance of the application object from the second client, and it may send the updated instance of the application object to other data centers in the plurality of data centers so that the application object is replicated among each of the other data centers.

In some embodiments, the first data center may save the application object in a hierarchical data structure comprising a plurality of key-value pairs. If so, any of the data centers may receive an update to at least one of the key-value pairs, save the update to the application object in the hierarchical data structure, send the updated key-value pair to all of the other data centers, and send the updated key-value pair to the second client and a plurality of additional clients who subscribe to a channel that corresponds to the key-value pair. The system also may append a transaction ID to the updated key-value pair, send one or more additional key value pairs with the transaction ID to the second client and the plurality of additional clients who subscribe to the channel and when all updates associated with the application object are complete send a transaction complete message to the second client and the plurality of additional clients who subscribe to the channel. Alternatively, the system may append a time token to the updated key-value pair, send one or more additional key value pairs with the time token to the second client and the plurality of additional clients who subscribe to the channel, and when all updates associated with the application object are complete advance the time token to a next increment and sending at least one message with the advanced time token to the second client and the plurality of additional clients who subscribe to the channel.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In this document the terms "application object," "data object" and in some instances simply "object" refer to one or more discrete bundles of stored data that may be used by a software application to perform a function. Examples include JavaScript Object Notation (JSON) objects (which typically consist one or more of attribute-value pairs) and ASP application objects.

As used in this document, a "cloud computing system," "cloud application service" or "web service" refers to one or more physical and/or logical computing devices that operate as a shared resource for multiple other computing devices. An example is a server on which an application is run or data is streamed, connected via an Internet protocol connection among several client computing devices. Examples of client devices include some computers equipped with a browser, smart phones and other networked devices, operating systems, and browsers. The client devices may run a specific application to receive the data, or they may simply open a window or other connection, such as via a browser, through which the client can view operation of the application on the remote server.

A "computing device" or "electronic device" is a device that includes a processor and non-transitory computer-readable memory. The memory contains programming instructions in the form of a software application that, when executed by the processor, causes the device to perform various operations according to the programming instructions. Examples of electronic devices include computers, servers, smartphones, personal digital assistants, cameras, tablet devices, electronic readers, personal computers, media players, satellite navigation devices and the like.

A "client" is electronic device that a subscriber or other user may use to access a web service, or an application installed and running on an electronic device for such use.

The terms "memory" and "computer-readable medium" each refer to a non-transitory device on which computer-readable data, programming instructions or both are stored. Unless the context specifically states that a single device is required or that multiple devices are required, the terms "memory" and "computer-readable medium" include both the singular and plural embodiments, as well as portions of such devices such as memory sectors.

A "data center" is memory device or portion of such a device that is part of a cloud computing system.

A "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments.

The terms "customer" and "user" as used in this document means an entity that requests or accesses various data objects on a hosted service.

The term "subscriber" as used in this document means a user that registers with a portion of the service that provides published application objects so that the subscriber automatically receives published data objects from the service.

The term "publisher" as used in this document means an entity that publishes or otherwise processes messages that are to be published.

Figure 1:
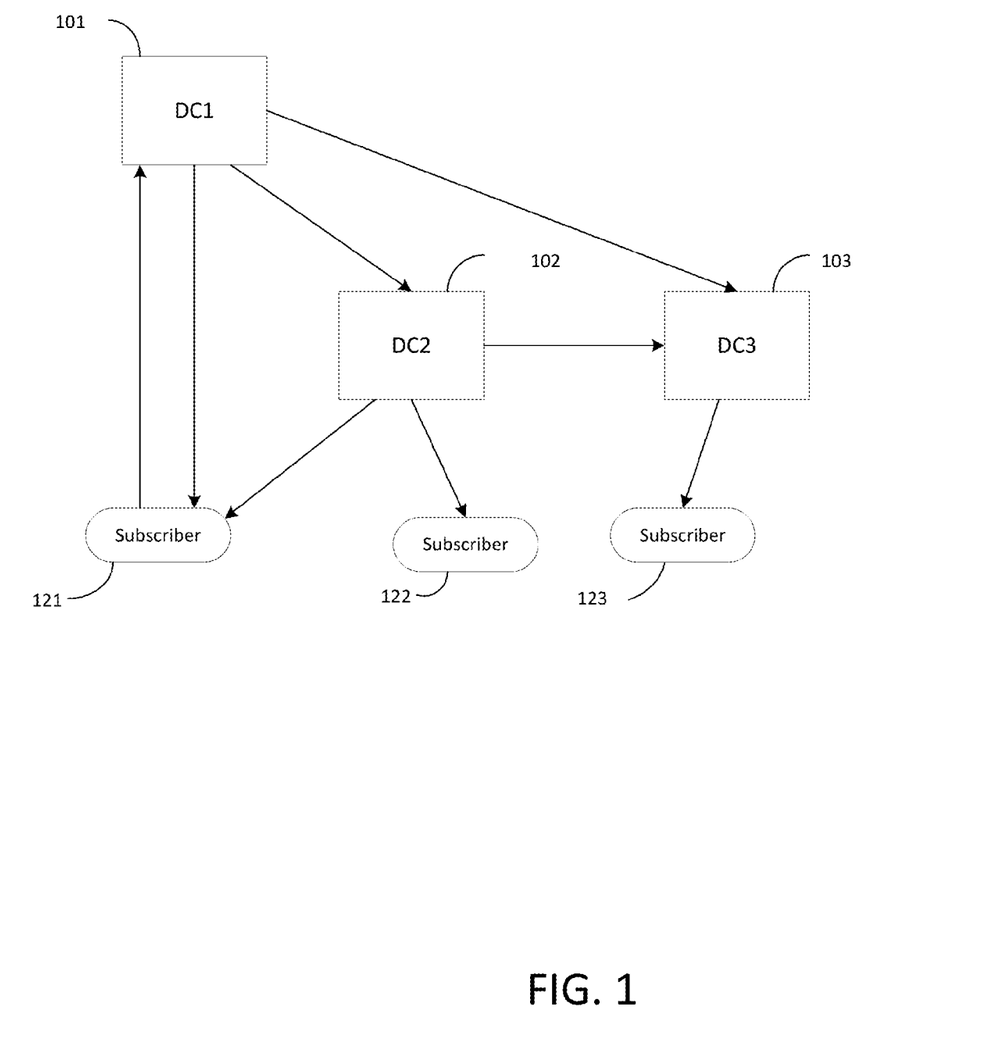
FIG. 1 depicts an embodiment of system for sharing information among various subscribers and other users.

FIG. 1 depicts an embodiment of various components of a system that passes data to multiple client devices, along with the devices that access the system. The system includes a set of data centers 101, 102, 103, across which data is replicated using methods such as those described below in this document. Although three data centers are illustrated in FIG. 1, any number of data centers may be used.

Any or all of the data centers 101-103 will automatically publish data updates to clients who are subscribers 121, 122, 123 to a data service. The publication may occur via one or more channels. A channel is a named destination to which clients subscribe and/or publish messages. Any number of subscribers may subscribe to a channel that publishes messages concerning a data object.

The data centers 101, 102, 103 also may relay data updates between each other, to help quickly replicate data updates across the network as in a mesh communication system. Optionally, some or all data centers may transmit data to non-subscribing user clients upon request from the client.

The data centers may automatically broadcast or otherwise publish data updates to subscribers via a method such as that described below, and as more fully described in U.S. patent application Ser. No. 13/624,314, filed Sep. 24, 2012, titled "Real-Time Distribution of Messages via a Network with Multi-Region Replication in a Hosted Service Environment," the disclosure of which is incorporated herein by reference in its entirety.

As will be explained in greater detail below, the subscriber clients 121-123 that are in communication with data centers 101-103 may be subscribed to particular channels. A channel is a data source or data topic to which a client subscribes to receive and or and/or publish messages. For example, in the context of a distributed gaming system, a subscriber may subscribe to one or more player channels, including his/her own channel, or the channel(s) of other player(s). Then, when the service receives updated application objects and the updates correspond to the any of the subscriber's channels, the subscriber may receive updates to those objects so that the subscriber has the latest data corresponding to the subscriber's channels.

A client may connect to a publishing data center using any now or hereafter known protocol. For example, the publishing data center, which may also be considered to be a subscriber node, may allow a long-lived connection such as long-polling, COMET, WebSockets, SPDY, BOSH, or other techniques. In some embodiments, any number of subscriber clients may subscribe to a channel that publishes messages relating to a topic that may be of interest to other subscriber clients. When one subscriber client publishes a message relating to the topic, the second data center will cause the applicable application object to be updated, and the message will be sent to other clients who subscribe to the channel.

In an example, a first client 121 may transmit a message to the data center 101. Data center 101 in turn transmits an application object corresponding to the message to the other data centers 102-103. Any of the data centers may include data collection caches where messages are temporarily stored for a particular duration. In addition, some of the data centers may be considered replication nodes that again relay the application object to other data centers for redundancy.

The system may operate using application objects, such as JSON objects that contain key/value pairs for various parameters. For example, an application object GameData/Players may contain data for various players in the context of a multiplayer game. Some of the values in the object for each player may remain static, such as the players name, avatar or location. Other values may change, such a score or state within the game. The system may enable other players to synchronize with the same application object so that one object may contain data for multiple players. Through the selection or assignment of channels, a particular user may be able to receive data only relating to specific players within the object, while not receiving data of other players who are not of interest to the particular user.

Figure 2:
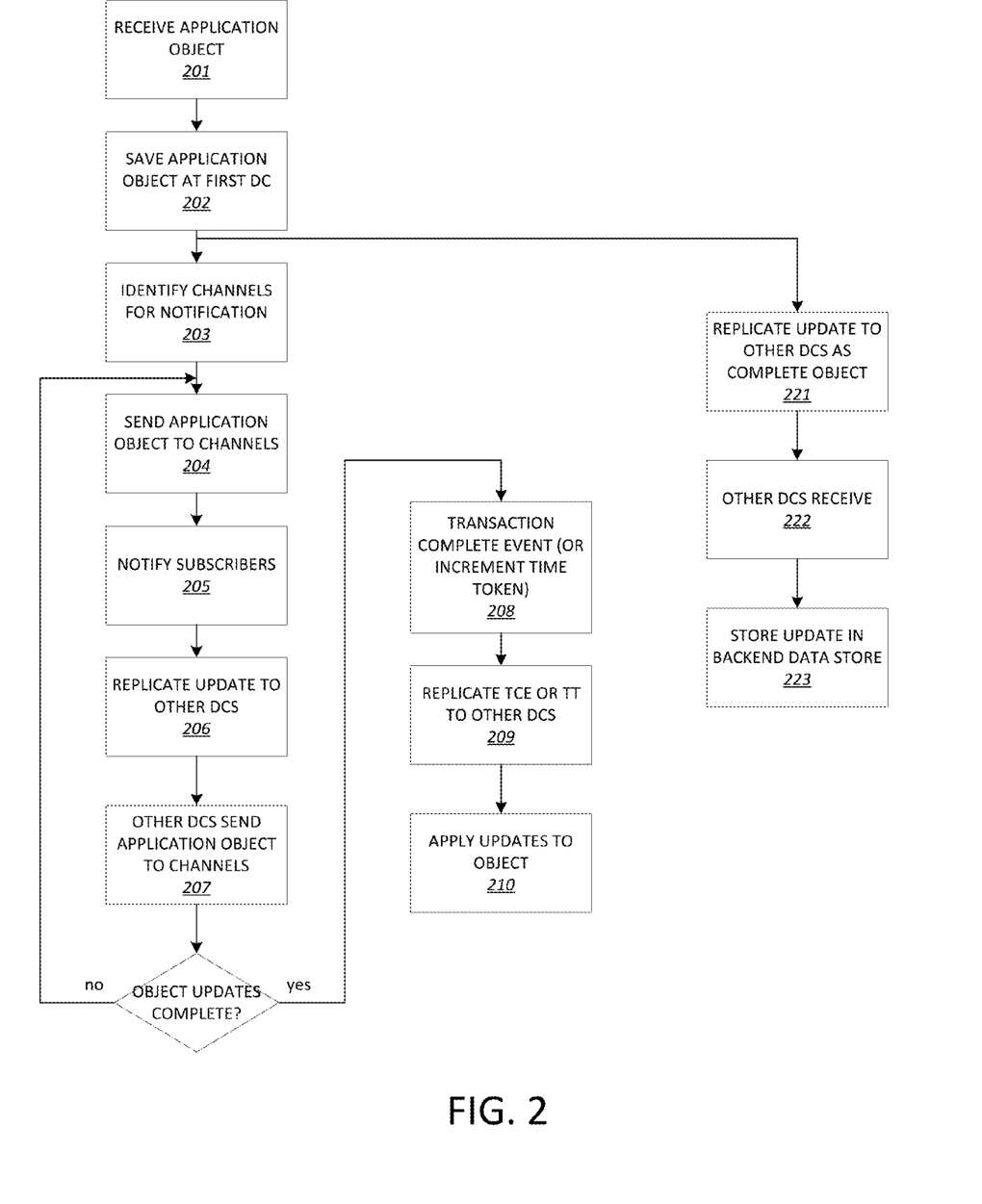
FIG. 2 is a flowchart illustrating various elements of a data synchronization process.

FIG. 2 is a flowchart that illustrates various elements of how the system may operate. When a first data center receives an application object from a first client 201, it may save the application object in a data collection at the first data center 202. It also may send the application object to all other data centers with which it communicates so that the application object is replicated among each of the data centers. It may do this by identifying a set of channels to which the notification is to be sent 203, and then sending the application object (or a portion of it), a path and optionally a transaction ID to each channel until all available channels have been updated with the new object (or object portion) 204. The first data center will then notify subscribers that are connected to the data center of the update 205 and send the update to all other data centers for replication 206. Each additional data center may similarly identify channels that need to be updated with the new information based on the portions of the object that changed 207.

Optionally, when the first data center has delivered all updates for an application object, it may send a "transaction complete" message to the appropriate channel or channels to indicate that the updates for the object are complete 208. The other data centers will receive and replicate the transaction complete message 209. Alternatively, the first data center may indicate that a transaction is complete by incrementing a time token associated with transmitted messages, as will be discussed in more detail below. If the transaction is not complete, the first data center and other data centers may continue the process until all updates are distributed. When the first data center distributes the transaction complete event or messages with the incremented time token 208, the first data center and other data centers may replicate 209 the message throughout the system using a process such as that described above.

Figure 3:
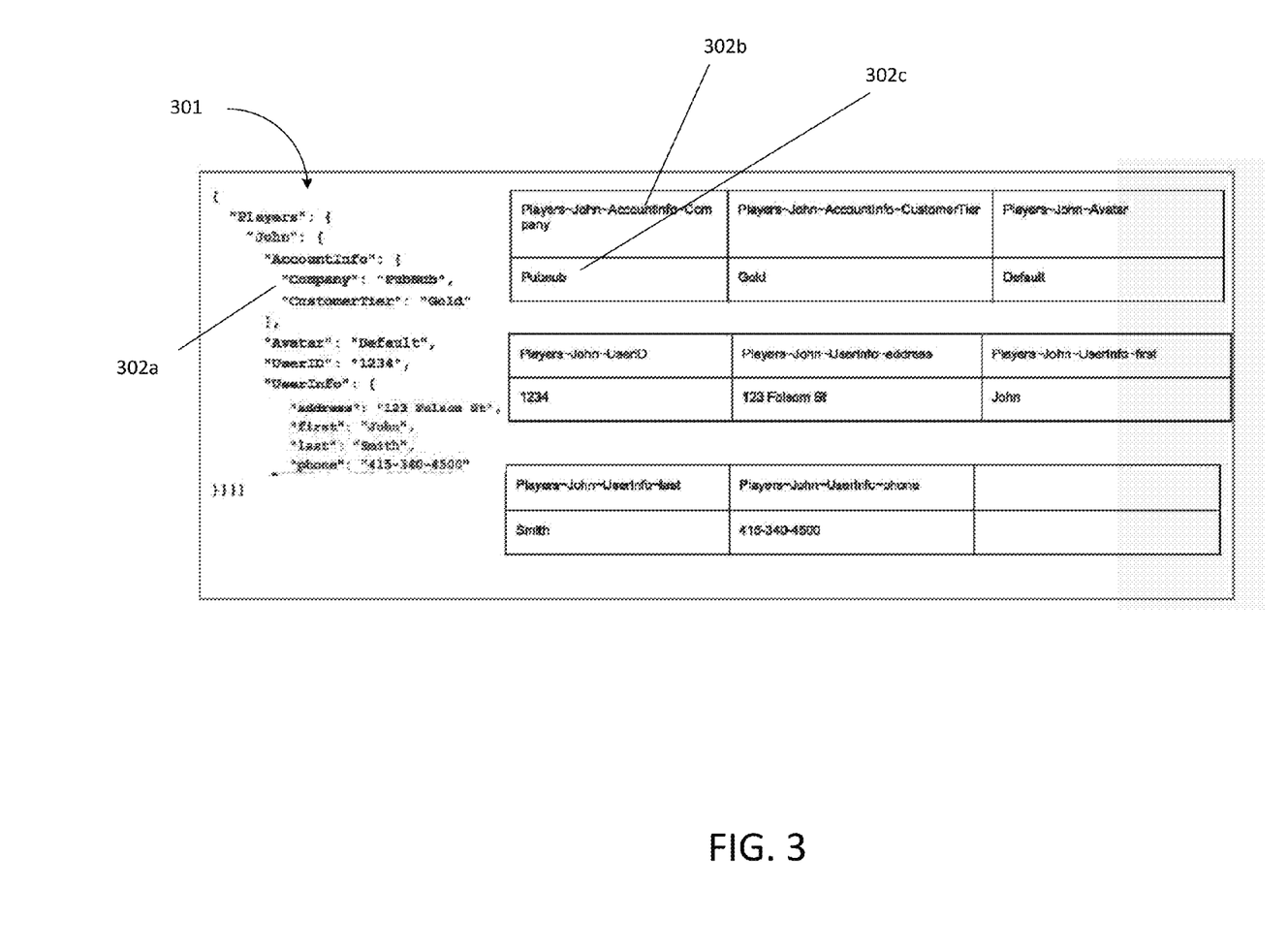
FIG. 3 is an example of a data structure for an application object in the embodiments of this document.

When saving and sending the application object, the data center that received the update may save and/or send it organized into various parts, using a hierarchy of key/value pairs, all of which will be applied as one or more updates to an object 210. An example of this is shown in FIG. 3, where a data object 301 contains multiple sub-objects 302a, each of which may contain one or more key/value pairs. For example, sub-object 302a contains a hierarchical key 302b with a value 302c "PubNub" in this object).

When any of the data centers identifies a credential for a second client, such as a credential that corresponds to a key and an identifier for an object (or portion of an object) to which the client subscribes, the second data center may transmit or otherwise provide at least a portion of the application object to the second client using processes such as those described above. When publishing a data update, optionally, each data center may publish a notification of the update, in addition to or along with the update itself. Optionally, only those parts of an object that have changed may be sent to the data centers, thus keeping the complete object in sync across all data centers. Also, each data center may send the updates to any subscribers that are connected to it to help ensure that updates are distributed to subscribers quickly. Alternatively, referring again to FIG. 2, the first data center may transmit an update as a complete application object 221 to other data centers. When each data center receives the update 222 it may save it as an update in a backend store 223.

In addition, a receiving software application installed in the subscriber device may automatically receive and apply updates to the local object without any requirement for user action. The user's device may do this by listening for updates received from one or more relevant channels relating to objects (or portions of objects) to which the subscriber subscribes.

Some channels may only be relevant to particular keys, so only updates to a particular key's value will change. For example, before publishing an update, the second data center may identify a channel that corresponds to the updated object (or its updated portion) 205. If so, then when sending the portion of the application object to the second client 210, it may send only the portion of the application object that corresponds to the channel. As an example, referring again to FIG. 3, the object is a player in an online game, a channel corresponding to the object portion "players-john-avatar" may publish an update when and if John changes his avatar. When this happens, all other subscribing game players who are interacting with John may subscribe to John's object portion "players-john-avatar" and receive updates to that object portion via an appropriate channel. On the other hand, updates to John's account information may be published on a different channel so that only subscribers who are authorized to receive John's account information are notified of changes to his account.

A subscriber also may use a wildcard to subscribe to a group of related channels. In such a case, the subscriber will receive notifications and updates if there is any message on any channel that corresponds to the wildcard. The hierarchical data structure of FIG. 3 facilitates this. For example, a subscriber who subscribes to "players-John-UserInfo-*" with "*" being the wildcard) will receive updates to any sub-object that is below "UserInfo" in the data tree. In the example of FIG. 3, this means that subscribers who use the wildcard will receive updates to the "address", "first", "last", and "phone" sub-objects.

In some instances, multiple clients may provide data that yields multiple updated instances of an application object. If so, the system may resolve differences and/or group all instances for potential delivery by various methods that may rely at least on part on time tokens and/or transaction identifiers (IDs) that are received with each client's update. For example, a publishing data center may send various components of an update out via various channels, each of which includes a time token and a transaction ID. When all of the components of the particular update have been complete, the data center may send a "transaction complete" message. In this configuration, clients who receive updates may be programmed to know to only implement the updates (by adding them to a local client record) after receiving the "transaction complete" message. Alternatively, the system may use a single time token for a group of messages, and then increment the time token to a next value when all components of a particular update are complete. In this configuration, clients who receive updates may be programmed to know to only implement the updates (by adding them to a local client record) after receiving a message with the new time token.

Figure 4:
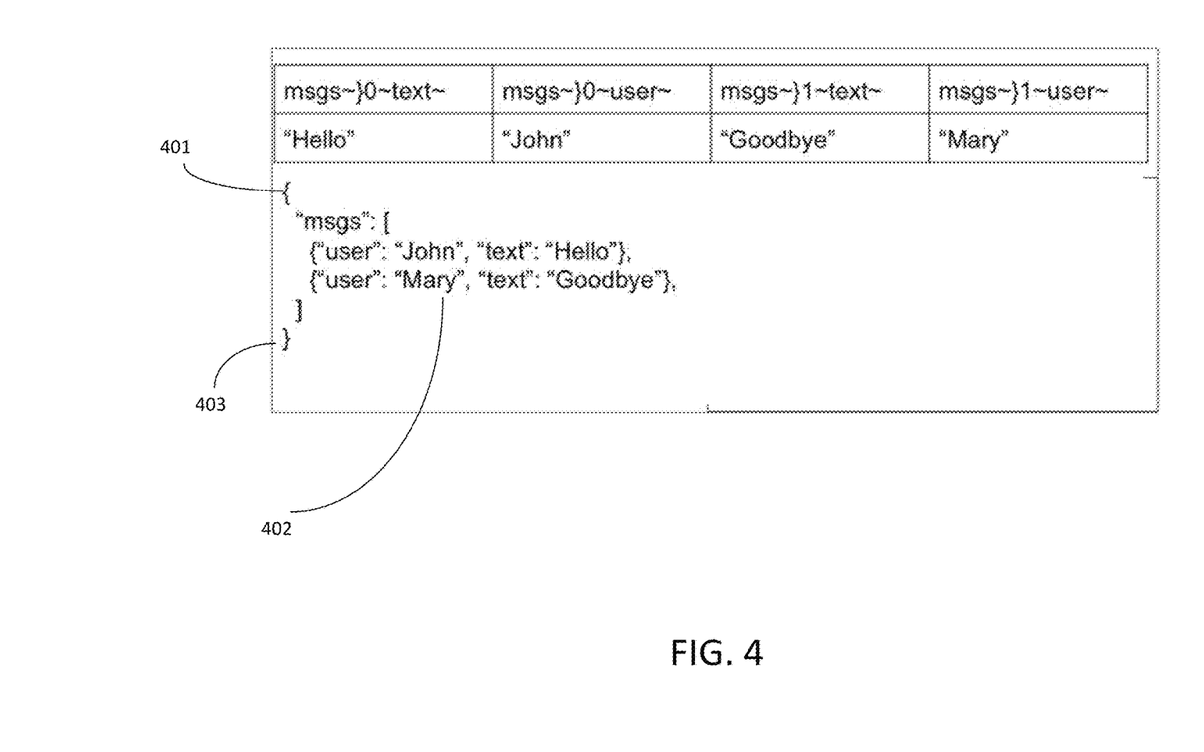
FIG. 4 is an example of an alternate data structure for an application object in the embodiments of this document.

As an alternative to the hierarchical structure, an object may be stored as a list. If so, the system may use path delimiters and store them inline in the object. An example of this is shown in FIG. 4, where the starting path delimiter 401 shows that one or more messages 402 will follow in list format. Ending path delimiter 403 shows that the messages are ended. When an object is updated, it may be written to the server, which may notify other data centers and subscribers that the object has been updated.

When sending the object, the system may send at least a portion of the global update of the application object to the requesting client. If the subscriber subscribes to a particular channel, then when sending the application object to the requesting client, the subscriber may receive only the portion of the global update that corresponds to that channel. When a change occurs to any object, the publisher may determine the channels to which the change applies, and it may construct a single message to publish the change, with a list of channels and messages for each channel. The data center may split a single application into subparts for delivery on different channels. If so, it may assign each subpart a common time token so that the receiving data centers can identify the various subparts as components of a single transaction.

When receiving an object or a subpart of an object on a subscribed channel, a subscribed client may assemble and update its stored instance of any application object by checking the time token of each received object (or subpart of an object) against the latest stored time token for the same object or subpart. To resolve the dilemma of how to merge or assemble multiple instances of the same object or subpart, it may apply the following process: (1) Identify the oldest message (object or subpart), based on the time token for the message. (2) If the value of the a current object time point is newer (higher) than the time token of the oldest message, then the client may presume that it missed an update and send the data center a request to fetch the object while continuing to receive broadcast updates. (3) On the other hand, if the value of the current object time point is older (lower) than the time token of oldest message, skip or discard the oldest message. (4) Apply all newer (updated) messages to the object.

Example applications of the embodiments described in this document include a mobile game that has users that span the globe. In this example, each user's device has established a persistent connection to a single backend store residing in California. Players residing close to California experience a "real-time" experience while playing the game, since the moves between players are replicated quickly. Players residing in Tokyo experience high latencies when playing players in California. Latencies become even higher when both players are in Tokyo, since all data sync traffic must be sent through California. The embodiments described above allow real-time distributed replication of the data between data centers located in Tokyo and California.

As another example, consider a financial application that synchronizes trades across thousands of users is maintaining application state in Virginia. Users from all over the world may rely heavily on the availability and timeliness of the data represented as state objects within the application. When the data center is operating normally, the application serves its purpose. But if the data center becomes unavailable, there is no fallback option available. Traditional data replication solutions are not viable, since they do not provide the automatic real-time data sync to all the end user devices. The embodiments described above may help solve this problem.

Other uses of the embodiments may include: (1) social and chat apps, for functions such as maintaining an address book and status of connections/friends in each chat room, or for status updates; (2) home automation, for functions such as registry of devices within a home/office with status of each device; (3) shared states for multiplayer games; (4) financial applications that need to keep transactions from many users in sync simultaneously; and (5) other situations when many devices of various types need to be kept in sync.

The embodiments discussed above may enable distributed applications to maintain a set of shared application objects that are automatically kept in sync across millions of applications/devices in real time (less than ¼ second latency). The objects may be hierarchical key/value pairs. The value can be a literal value or a nested object. The state synchronization occurs across even when the devices are connected to different data centers across the world. This ensures real time synchronization, fail over and high availability even in the event of a data center or network issues from a device to a specific data center.

Features of the processes may include any or all of the following: (1) Ability to store and synchronize any number of objects without requiring a separate store for application state; (2) Objects can be hierarchical and contain any number of key/value pairs. Each value can be a literal value or another nested object; (3) Special list handling—define ordering and insert/update/append of elements within the list; (4) Users and devices can choose to synchronize the entire object or a part of the object. Simple application programming model for enabling object synchronization; (5) Automatic synchronization in less than 250 milliseconds across millions of devices; (6) Read/Write access control to grant permissions to the entire object or to a part of the object; (7) Object consistency—if a client makes a set of changes in one transaction, these may be applied as one unit (using transaction semantics) to all the synchronized objects ensuring object consistency at all times; (8) Ability to encrypt parts of the object using AES encryption with application managed keys; and (9) Automatic catch-up and recovery in case of intermittent connectivity or changing networks.

Figure 5:
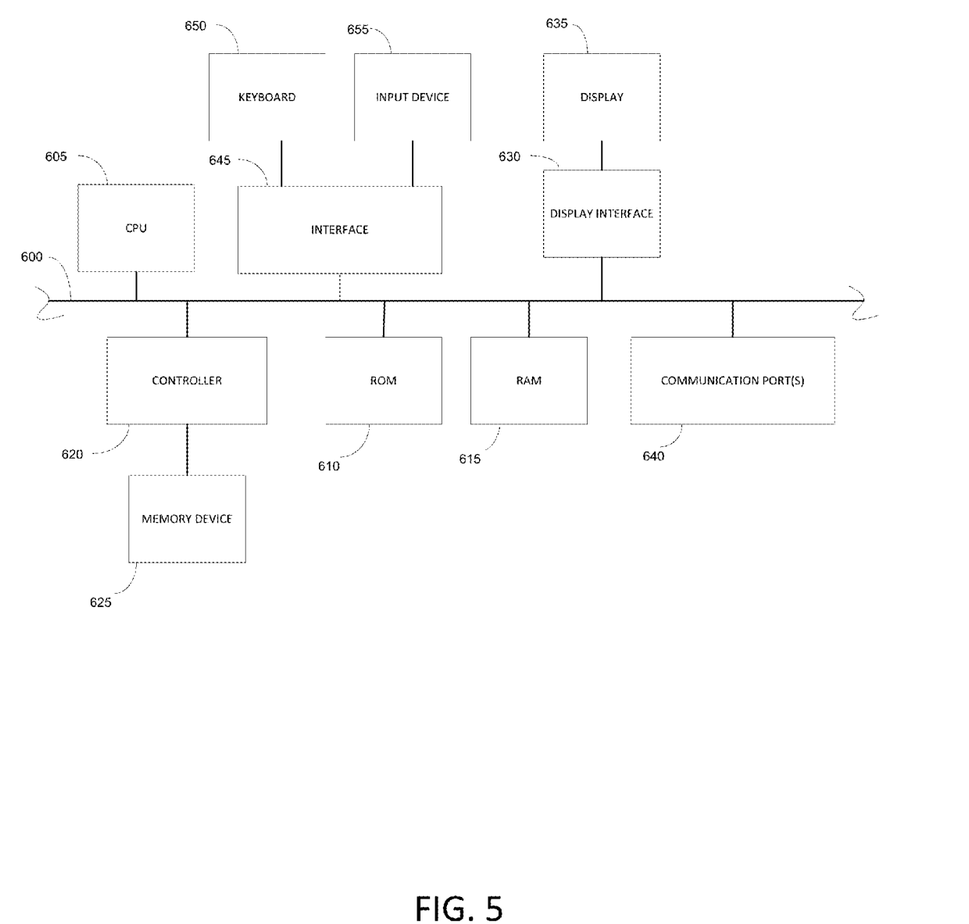
FIG. 5 is a block diagram of elements of a hardware via which the various systems in this document could be implemented.

FIG. 5 is a block diagram showing various hardware components that may be part of a web service provider's electronic device or any client electronic device. For example, any of the devices shown in FIG. 1 may include similar internal hardware architecture such as that illustrated in FIG. 5. An electrical bus 600 serves as an information highway interconnecting the other illustrated components of the hardware. CPU 605 is a central processing unit of the system, performing calculations and logic operations required to execute a program. CPU 605, alone or in conjunction with one or more of the other elements disclosed in FIG. 5, is a processing device, computing device or processor as such terms are used within this disclosure. Read only memory (ROM) 610 and random access memory (RAM) 615 constitute examples of memory devices.

A controller 620 interfaces with one or more optional memory devices 625 that service as data storage facilities to the system bus 600. These memory devices 625 may include, for example, an external DVD drive or CD ROM drive, a hard drive, flash memory, a USB drive or another type of device that serves as a data storage facility. As indicated previously, these various drives and controllers are optional devices. Additionally, the memory devices 625 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 610 and/or the RAM 615. Optionally, the program instructions may be stored on a non-transitory computer readable medium such as a compact disk, a digital disk, flash memory, a memory card, a USB drive, an optical disc storage medium, a distributed computer storage platform such as a cloud-based architecture, and/or other recording medium.

A display interface 630 may permit information from the bus 600 to be displayed on the display 635 in audio, visual, graphic or alphanumeric format. Communication with external devices may occur using various communication ports 640. A communication port 640 may be attached to a communications network, such as the Internet, a local area network or a cellular telephone data network.

Additional functional details of various embodiments are further disclosed. For example, various embodiments may function as follows from a user perspective:

1) A client application first creates an object within a namespace—for example: GameData/Players. The application needs to provide api keys when creating or synchronizing the object. This is used to separate the same object used across different clients on the same server.

2) The app can then set the data with a JSON object, an example is shown as below:

```
{
    "Players": {
        "John": {
            "TopScore": 1600,
            "Name": "John Smith",
            "Address": {
                "City": "San Francisco",
                "Zipcode": "94107"
            }
        },
        "Mary": {
            "TopScore": 3100,
            "Name": "Mary Rhodes",
            "Address": {
                "City": "Redwood City",
                "Zipcode": "94065"
            }
        }
    }
}
```

3) Another device (using the same api key) may choose to synchronize the same top level object "GameData/Players". Once this is done that object is kept in sync across the two users while they are connected. Note that any number of users/devices could be synchronizing the same object.

4) Similarly, if there is a different user that is interested only in a specific player, they can choose to synchronize just that subset, for example, GameData/Players/John. This user's copy is modified only if the attributes of this player (John Smith) are changed by a different user/device.

5) Client applications may perform operations such as Get, Set, Update and Delete on the objects. Get reads the entire object or a part of the object. Set replaces the existing value for an attribute. Update merges the object with the new values of the specified attributes; delete removes an entry from the object or the entire object. All of these operations can be done by any user subscribed to the object—subject to the read/write permissions that have been granted to them by the administrator.

6) The users can be connected to any of the data centers, which may be worldwide—the data is automatically replicated and their local object may be synchronized in less than ¼ of second. A potential advantage of this is that the client may connect to the closest data center to get the lowest latency, but will receive updates to the objects even if they are updated by devices connected to different data centers.

7) If a client is temporarily disconnected, their client changes are cached locally and the changes from other users are queued on the server. When the client connects, the publishing servers deliver any messages that they may have missed and the client applies the changes to the local object. Also, any local changes are transmitted to the server for synchronizing with other users.

Other non-limiting features may also include: 1) Authorization and access control—Users can be granted read and/or write permissions to the entire object or to a specific path within the object. If so, the administrator has to provide the publish key, subscribe key, secret key, object path and the auth-token for the device/user to whom access is being granted. Access can be granted indefinitely (or until a revoke is called) or for a specific time period; 2) Users may choose to encrypt specific keys within the object; 3) The servers can create a snapshot of the object at a specific time, but maintaining a history of updates to the object and applying them sequentially until a specific time value; 4) Clients can work offline for a short duration when the device is disconnected. When they are connected again, the objects that are modified locally are automatically synchronized.

By way of example, the system may comprise one or more of the following components: 1) Time series data store for hierarchical object storage; 2) Data Streams—Publish/Subscribe messaging with multiple channels per object depending on the hierarchical structure; 3) Access manager for security; 4) Global replication of messages and object store across multiple data centers; 5) Message/Event distribution in real time to users/devices across data centers; 6) SDKs for handling user objects, invoking REST apis to perform object operations and responding to change notifications from server.

In one embodiment, at high level, the following steps are performed:

1) Objects may be stored using PUT operations and retrieved using GET operations. Users can retrieve the entire object or a subset of the object. This is further illustrated in the sample codes as shown in the table below.

| Retrieving Data | GET /Players |
|---|---|
| }<br>"Players": {<br>  "John": {<br>    "TopScore": 1600,<br>    "Name": "John Smith",<br>  },<br>  "Mary": {<br>    "TopScore": 3100,<br>    "Name": "Mary Rhodes",<br>  }<br>}<br>} | {<br>  "John": {<br>    "TopScore": 1600,<br>    "Name": "John Smith",<br>  },<br>  "Mary": {<br>    "TopScore": 3100,<br>    "Name": "Mary Rhodes",<br>  }<br>}<br>GET /Players/John<br>{"Name": "John Smith", "TopScore": |

```
                "1600"}
            GET /users/Mary/TopScore
            3100

Modifying Data
{"Players": {
    "John": {"age": 50}
}}
                                PUT /Players/
                                -d {"Location": {"state": "OR"}}
{"Players": {
    "John": {"age": 50},
    "Location": {"state": "OR"}
}}
                                PUT /Players/John/age
                                10
{"Players": {
    "John": {"age": 10},
    "Location": {"state": "OR"}
}}
```

2) When an object is created, the key/values at each level are separated and stored as separate columns in a database. The relevant features are shown as below, by way of example.

Figure 6:
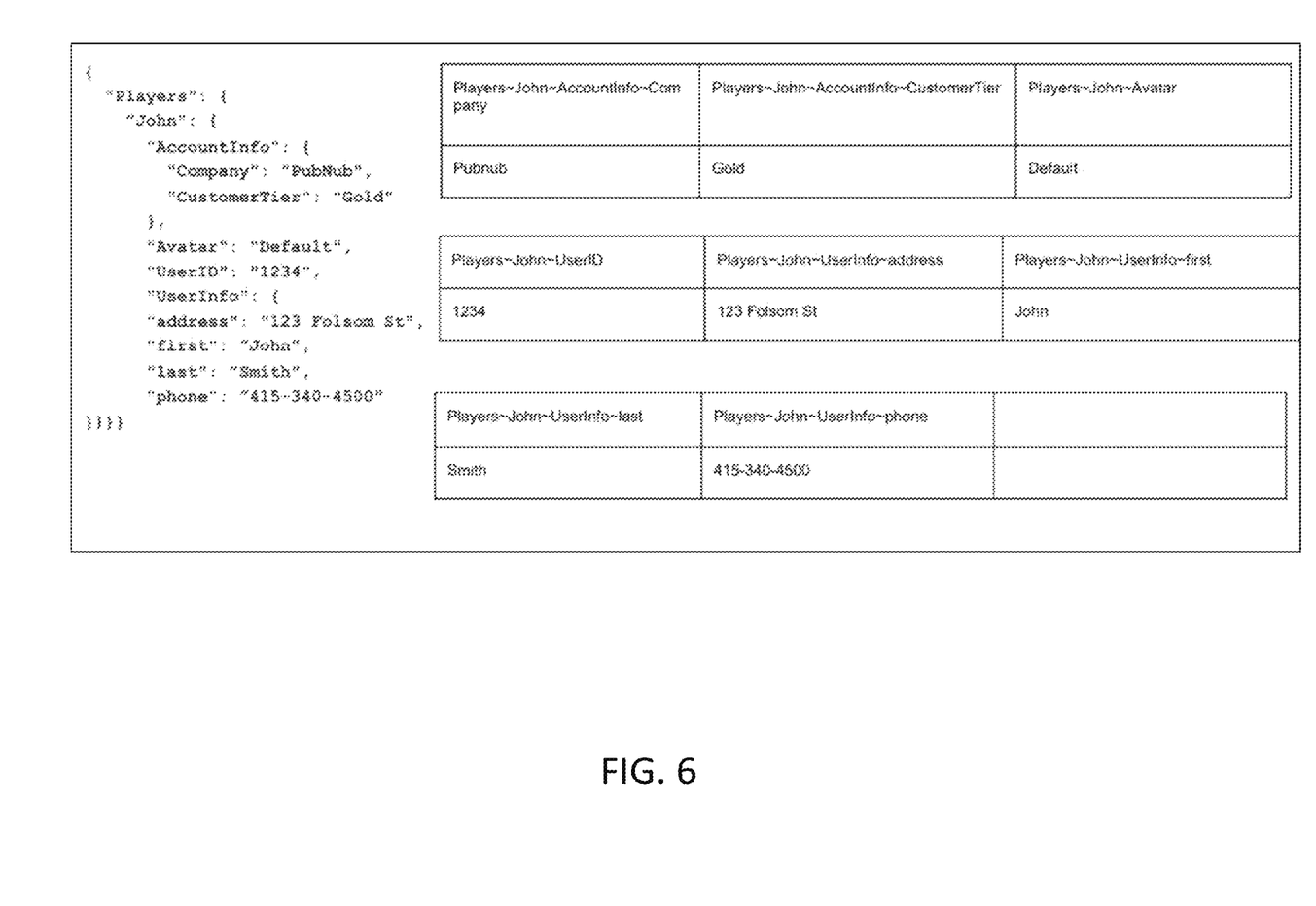
FIGS. 6-8 illustrate examples of data structure for an object in the embodiments of this document.

Data Storage: The system may optionally use a high Unicode code point (U+10FFFD) as the path delimiter in the column name. This is to avoid conflicts with other common characters in the column name. In the examples below, "~" is used to represent that code point just to make the examples easy to read. So the value for Players/John/AccountInfo/Company is stored in column Players~John~AccountInfo~Company. An example is shown in FIG. 6.

Figure 7:
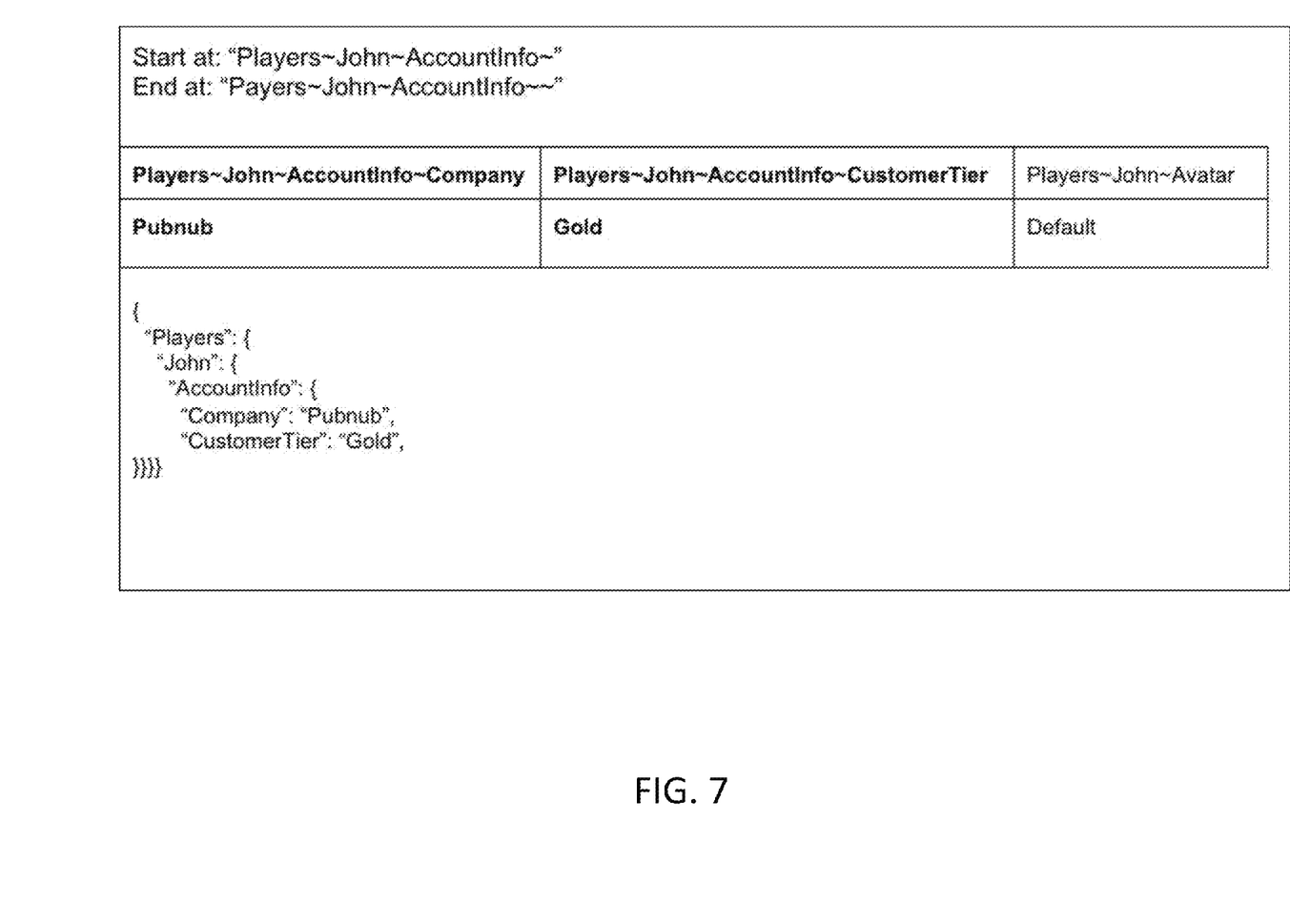

Retrieving data: An example is shown in FIG. 7. If the object is a list, then it requires special handling.

Figure 8:
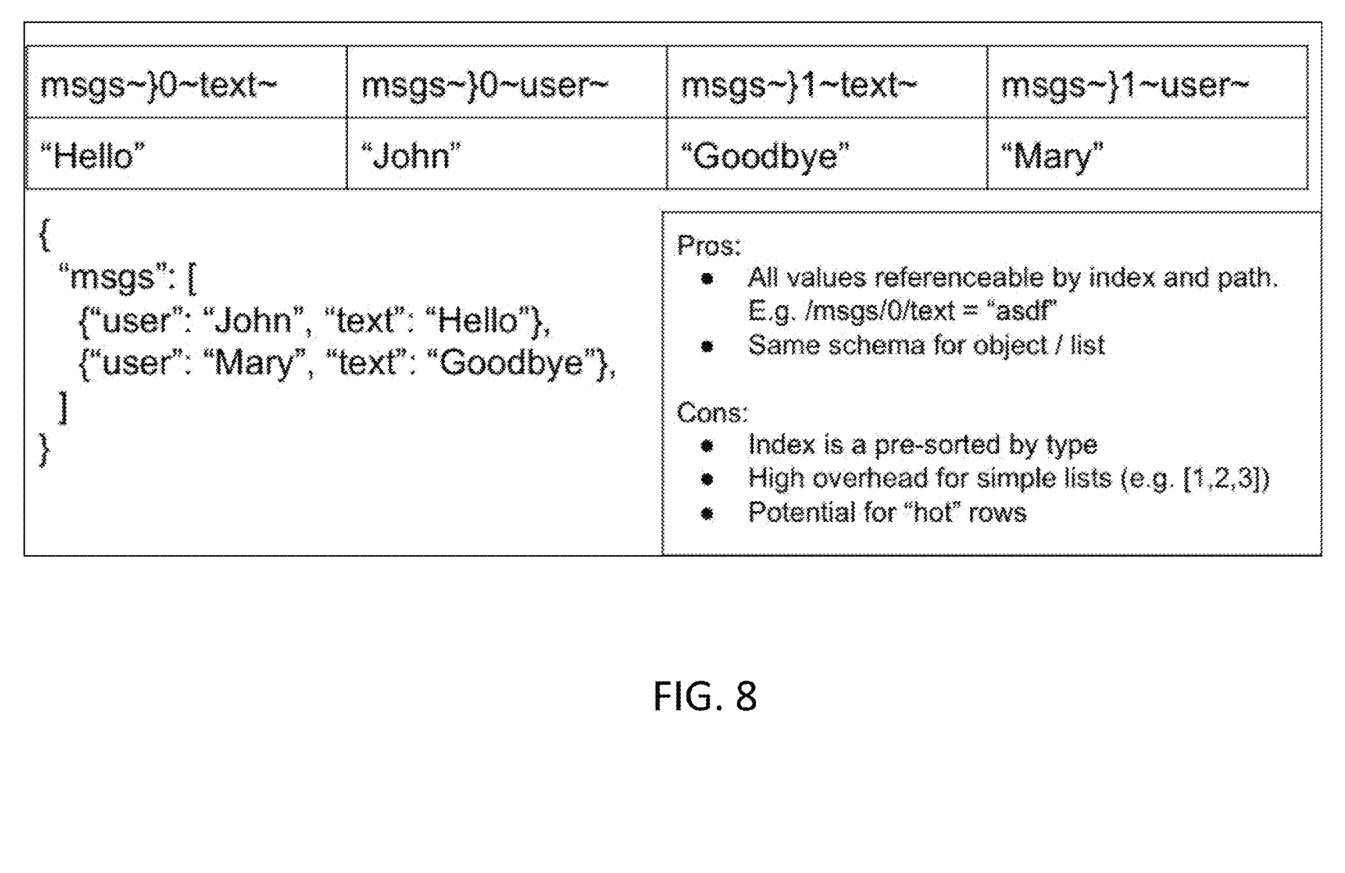

Storing Lists: As disclosed above the system may use the Unicode point U+10FFFD as the path delimiter. When storing lists, the system may store them inline along with the object. U+10FFFC is used as the character to designate the path as the list element during unpacking. U+10FFFC is used because it sorts below U+10FFFD making list lookup easier. In the example below "}" is used to represent U+10FFFC to make the example easier to read. This is illustrated in FIG. 8.

3) When an object is updated, it may first be written to the server using REST calls and then the storage layer on the server notifies all the other users subscribing to the object using published data streams. The data store may be replicated asynchronously but the notifications to all the users are done immediately. The events are also replicated immediately across all the data centers using published data streams.

4) Notification of the changes may be done via multiple channels. The channel naming convention may follow the hierarchy of the object tree. For example, consider the following object that includes users:

```
{
    "Players": {
        "John": {
            "TopScore": 1600,
            "Name": "John Smith",
            "Address": {
                "City": "San Francisco",
                "Zipcode": "94107"
            }
        }
```

```
        },
        "Mary": {
            "TopScore": 3100,
            "Name": "Mary Rhodes",
            "Address": {
                "City": "Redwood City",
                "Zipcode": "94065"
            }
        }
    }
}
```

One or more users make the followings updates, for example, a) Change Mary's city and zipcode to Fremont and 94536 respectively. This will generate the following messages on the channel Users.Mary.Address.City and Users.Mary.Address.Zipcode:

```
{
    "action": "update",
    "location": "GameData.Players.Mary.Address.Zipcode",
    "value": "94539"
}
{
    "action": "update",
    "location": "GameData.Players.Mary.Address.City",
    "value": "Fremont"
}
``` b) Another update could be to add a new user "Jamie": {"Name": "Jamie Lee", "ID": "366", "Address": {"City": "San Mateo", "Zipcode": "94403"}. This will result in the following updates:

```
{
    "action": "update",
    "location": "GameData.Players.Jamie.Name",
    "value": "Jamie Lee"
}
{
    "action": "update",
    "location": "GameData.Players.Jamie.TopScore",
    "value": 2100
}
{
    "action": "update",
    "location": "GameData.Players.Jamie.Address.Zipcode",
    "value": "94403"
}
{
    "action": "update",
    "location": "GameData.Players.Jamie.Address.City",
    "value": "San Mateo"
}
```

The updates may be delivered only to the devices that are synchronizing that part of the object. For example, there may be three devices that are receiving data from different data centers:

Device 1—accessing Users
Device 2—accessing Users/Mary
Device 3—accessing Users/John The events from the first update (where Mary's details changed) are delivered to Device 1 and Device 2. The events from the second update (where new user Jamie was added) are delivered only to Device 1.

5) The devices express may interest for specific sections of the object using a "Wildcard channel subscription". Wildcard subscribes allow devices to subscribe to channels of the form players.*. In this case any channel with the prefix "player." will match the subscription. Since objects and their attributes are transient, the device that is accessing the object may not have advance knowledge of the list of channels. By subscribing to a wildcard channel, it will receive notifications of any of the channels that represent the tree below the path.

6) When a device accesses a specific object path (such as GameData/Players), it may be automatically subscribed to the following channels GameData.Players, GameData.Players.* and pn_dstr_GameData. The first two channels are used for notification of changes at the top level of the Object and any part of the tree below the object. The last channel (pn_dstr..) is used to get notification that the transaction is complete. This is further explained below.

7) Updates may be grouped into a single atomic operation. In many cases one update to the object may result in multiple notifications being generated. For example, in the case above where a new player "Jamie" was added to the tree—a single operation from one user resulted in 4 notifications. In order to maintain consistency of the data set, in some embodiments these operations may be done on each client as one unit or they are not performed at all. Two different approaches are described as below, by way of example.

Use Transaction identifiers: In this approach, the publisher does the following: Sends a separate message for each leaf level update. The channel name depends on the level of the attribute within the object. In the example above, if a player's score is changed, the channel name would be GameData.Players.<PlayerName>.TopScore. Similarly, if the city is changed, the message contains the location of the change, new value (for insert/update operations) and a transaction identifier. In addition to sending messages on channels corresponding to the level of the tree where the change occurred, the client could also use an additional channel called "pn_dstr_<ObjectID>" to send transaction notifications. After all the notifications are sent to the respective channels, a message is sent to the transaction channel to indicate completion of a specific transaction.

Each of the clients could receive the message to do the following: (1) Fetch the initial version of the object using the Get operation; (2) Subscribe to the top level object path and all the channels below it (using wildcard subscriptions described above); (3) When a message is received on any of the channels, the client makes a change to a copy of the object but doesn't apply it to the main object till the transaction is complete; (4) The client continues to receive notifications and apply them to the parts of the tree that are modified. For each of the changes, it registers the transactionID of the change; (5) The client also subscribes to the pn_ds_tr channel that includes transaction notifications for that object. When it receives the transaction complete notification, it knows that there would be no more notifications for that transaction; (6) When the transaction is complete, it applies all the changes to the main object to synchronize it with the server object. This approach works well to ensure that under no circumstances an object change is modified till the transaction is complete.

Atomic publishes using timetoken: Another approach to achieve the same without using a transaction channel is "Atomic publishes using common timetoken." In this approach, the publisher does the following: (1) When a change is performed on an object, the publisher determines the channels on which the change has to be published and constructs a single request with the list of channels and the list of messages for each channel; (2) Published data streams may include a "multi-publish" operation where the system can receive a single request for publishing to multiple channels; (3) With the multi-publish operation—the server receives all the message in one atomic operation and then splits them into constituent messages to be delivered on different channels. However, when it does so, it will ensure that each of the messages get the "same timetoken". By using this technique, the timetoken serves the purpose of a transaction identifier.

The client that is subscribing may do the following: (1) Set timetoken to 0 and subscribe to the top level object path and all the channels below it (using wildcard subscriptions described above); (2) Fetch the object; (3) The following loop steps will lead to a repeatedly re-synchronized object: (i) Re-subscribe to updates with the most recent time token; (ii) Once the subscribe returns, check the timepoint of the value in the oldest message against the current object timepoint; (iii) If the value in the oldest message is newer, then updates are potentially missed. Re-fetch the object while continuing to subscribe to updates. The client needs an update message queue for this; (iv) If the value in the oldest message is older or equal to the current object timepoint, then skip these older or equal updates—they are redundant; (iv) Apply all update messages to object, the result is a fully up-to-date object, as of the timepoint of the newest update message; (vi) Discard all queued (and applied) update messages, except for the oldest one serving purely as a marker, and re-subscribe for updates using the most recent time token. Resume the loop above.

The disclosed features and functions disclosed above, as well as alternatives, may be combined into other different systems or applications. Various presently unforeseen or unanticipated alternatives, modifications, variations or improvements may be made by those skilled in the art, each of which is also intended to be encompassed by the disclosed embodiments.

The invention claimed is:

1. A method of synchronizing data to multiple users via multiple data centers, comprising:
   by a first data center of a plurality of data centers:
     receiving an application object from a first client, wherein the application object comprises a key and a value,
     saving the application object in a data collection at the first data center, and
     sending the application object to all other data centers in the plurality of data centers so that the application object is replicated among each of the plurality of data centers;
   by a second data center of the plurality of data centers:
     automatically, without requiring an intervening request from a second client for the application object, sending at least a portion of the application object to the second client by:
       identifying a channel to which the second client subscribes,
       selecting at least a portion of the application object that corresponds to the channel, and
       when sending the at least a portion of the application object to the second client, sending only a portion of the application object that corresponds to the channel.

2. The method of claim 1, further comprising:
   by the second data center, receiving an updated instance of the application object from the second client, and
   sending the updated instance of the application object to other data centers in the plurality of data centers so that the application object is replicated among each of the other data centers.

3. The method of claim 1, further comprising:
by the first data center, saving the application object in a hierarchical data structure comprising a plurality of key-value pairs.

4. The method of claim 3, further comprising, by any of the data centers:
receiving an update to at least one of the key-value pairs;
saving the update to the application object in the hierarchical data structure;
sending the updated key-value pair to all of the other data centers; and
sending the updated key-value pair to the second client and a plurality of additional clients who subscribe to a channel that corresponds to the key-value pair.

5. The method of claim 4, further comprising:
appending a transaction ID to the updated key-value pair;
sending one or more additional key value pairs with the transaction ID to the second client and the plurality of additional clients who subscribe to the channel; and
when all updates associated with the application object are complete, sending a transaction complete message to the second client and the plurality of additional clients who subscribe to the channel.

6. The method of claim 4, further comprising:
appending a time token to the updated key-value pair;
sending one or more additional key value pairs with the time token to the second client and the plurality of additional clients who subscribe to the channel; and
when all updates associated with the application object are complete, advancing the time token to a next increment and sending at least one message with the advanced time token to the second client and the plurality of additional clients who subscribe to the channel.

7. The method of claim 1, further comprising:
by the first data center, saving the application object in a list structure.

8. A system for synchronizing data to multiple users via multiple data centers, comprising:
a plurality of data centers, comprising at least a first data center and a second data center, wherein the first data center comprises:
a processing device, and
a non-transitory computer readable medium in communication with the processing device and configured to store a set of instructions that, when executed, cause the processing device of the first data center to:
receive an application object from a first client, wherein the application object comprises a key and a value,
save the application object in a data collection at the first data center, and
send the application object to all other data centers in the plurality of data centers so that the application object is replicated among each of the plurality of data centers,
and wherein the second data center comprises:
a processing device, and
a non-transitory computer readable medium in communication with the processing device and configured to store a set of instructions that, when executed, cause the processing device of the second data center to:
automatically, without requiring an intervening request from a second client for the application object, send at least a portion of the application object to the second client by:
identifying a channel to which the second client subscribes,
selecting at least a portion of the application object that corresponds to the channel, and
when sending the at least a portion of the application object to the second client, sending only a portion of the application object that corresponds to the channel.

9. The system of claim 8, wherein the second data center further comprises instructions for causing the processing device of the second data center to:
receive an updated instance of the application object from the second client, and
send the updated instance of the application object to other data centers in the plurality of data centers so that the application object is replicated among each of the other data centers.

10. The system of claim 8, wherein the first data center further comprises instructions for causing the processing device of the first data center to:
save the application object in a hierarchical data structure comprising a plurality of key-value pairs.

11. The system of claim 10, wherein any of the data centers of the plurality of data centers is configured to:
receive an update to at least one of the key-value pairs;
save the update to the application object in the hierarchical data structure;
send the updated key-value pair to all of the other data centers; and
send the updated key-value pair to the second client and a plurality of additional clients who subscribe to a channel that corresponds to the key-value pair.

12. The system of claim 11, wherein the any of the data centers of the plurality of data centers is further configured to:
append a transaction ID to the updated key-value pair;
send one or more additional key value pairs with the transaction ID to the second client and the plurality of additional clients who subscribe to the channel; and
when all updates associated with the application object are complete, send a transaction complete message to the second client and the plurality of additional clients who subscribe to the channel.

13. The system of claim 11, wherein the any of the data centers of the plurality of data centers is further configured to:
append a time token to the updated key-value pair;
send one or more additional key value pairs with the time token to the second client and the plurality of additional clients who subscribe to the channel; and
when all updates associated with the application object are complete, advance the time token to a next increment and send at least one message with the advanced time token to the second client and the plurality of additional clients who subscribe to the channel.

14. The system of claim 8, wherein the first data center further comprises instructions for causing the processing device of the first data center to save the application object in a list structure.

15. A method of synchronizing data to multiple users via multiple data centers, comprising:
by a first data center of a plurality of data centers:
receiving one or more components of an update of an application object from one or more clients, saving the one or more components of the update of the application object in a data collection at the first data center, and sending the application object to all other data centers in the plurality of data centers so that the application object is replicated among each of the plurality of data centers;

by a second data center of the plurality of data centers:
appending a time token to the one or more components of the update of the application object, sending the one or more components of the update with the time token to a plurality of additional clients who subscribe to a channel, and when all updates associated with the application object are complete:
advancing the time token to a next increment, and
sending at least one message with the advanced time token to the plurality of additional clients who subscribe to the channel; and by any of the plurality of additional clients:
in response to receiving the at least one message with the advanced time token, implementing the one or more components of the update.

16. The method of claim 15, wherein:

each of the one or more components of the update of the application object comprises a key-value pair; and sending the application object to all other data centers in the plurality of data centers comprises sending only the saved one or more components of the update to all other data centers in the plurality of data centers.

* * * * *